United States Patent [19]
Johnson

[11] 4,094,837

[45] June 13, 1978

[54] CORROSION INHIBITING PRIMER PAINT FOR HAND CLEANED FERROUS METALS

[75] Inventor: William C. Johnson, Kintnersville, Pa.

[73] Assignee: Bethlehem Steel Corporation, Bethlehem, Pa.

[21] Appl. No.: 795,583

[22] Filed: May 10, 1977

[51] Int. Cl.² .......................... C09D 3/64; C09D 5/08
[52] U.S. Cl. ............... 260/22 A; 106/14.24; 260/22 R; 428/458
[58] Field of Search ............ 260/22 A, 22 R; 106/14; 428/458

[56] References Cited

U.S. PATENT DOCUMENTS

| | | | |
|---|---|---|---|
| 862,888 | 8/1907 | Eberson | 106/14 |
| 1,584,151 | 5/1926 | Shimadzu | 106/14 |
| 1,652,217 | 12/1927 | Schaeffer et al. | 106/14 |
| 2,184,324 | 12/1939 | Strauss | 106/14 |
| 2,858,285 | 10/1958 | Johnson | 106/14 |
| 2,985,539 | 5/1961 | König | 106/14 |
| 3,380,836 | 4/1968 | Robinson | 260/22 A |
| 3,876,574 | 4/1975 | Nagahisa et al. | 260/22 R |

OTHER PUBLICATIONS

Singer, *Fundamentals of Paint, Varnish, and Lacquer Technology*, American Paint Journal Company, St. Louis, Mo. 1957, pp. 168-171.

Burns et al., *Protective Coatings for Metals*, Reinhold Publishing Corp., N.Y., N.Y., 1955, pp. 403, 404.

*Primary Examiner*—Ronald W. Griffin
*Attorney, Agent, or Firm*—Joseph J. O'Keefe; Charles A. Wilkinson; John S. Simitz

[57] ABSTRACT

A red lead primer paint having excellent wetting and penetrating characteristics, which when applied to the surface of ferrous metals forms a tough, resilient, adherent coating characterized by having excellent weathering and corrosion inhibiting properties, is comprised of a red lead pigment well dispersed in a binder of raw linseed oil and long oil alkyd resin. The red lead primer paint has a pigment volume concentration (PVC) within the range of about 25% to about 30%. The concentration of the red lead pigment in the primer paint is in the range of 0.25 to 2.2 pounds per gallon (29.95 to 263.56 grams per liter) of solids. The binder is comprised of raw linseed oil and a long oil alkyd resin mixed in a ratio within the range of 1:1 to 2:1.

10 Claims, 1 Drawing Figure

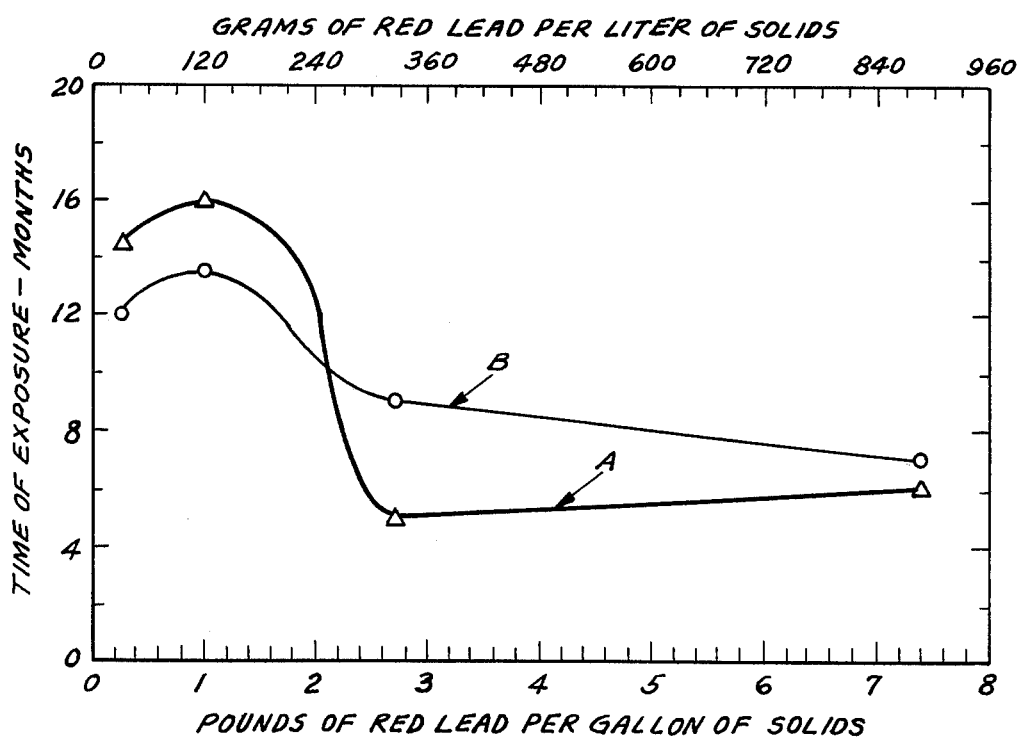

CORROSION INHIBITING PRIMER PAINT FOR HAND CLEANED FERROUS METALS

BACKGROUND OF THE INVENTION

Red lead pigments have been used for many years to inhibit the corrosion of ferrous metals. The protective action of red lead pigments dispersed in an oil binder or vehicle, for example vegetable oils, are unexcelled. As is well known, red lead contains varying amounts of red lead oxide or tri-lead tetroxide ($Pb_3O_4$) and litharge or lead monoxide (PbO). The amount of each of the oxides is dependent upon the control of the oxidation of metallic lead to litharge and the oxidation of litharge to red lead oxide during production of red lead pigments. Commercially, four grades of red lead pigment are made, namely 85%, 95%, 97% and 98% based upon the amount of red lead oxide in the pigment.

For many years red lead pigments were dispersed in raw linseed oil. While the primer paint thus produced had excellent corrosion inhibiting properties, the heavy lead pigments "settled-out" during storage. Then, too, the primer paint hardened in the container because of the reactivity of litharge, which is more reactive than red lead oxide, with the fatty acids in the raw linseed oil. In present day practice, the 85% grade red lead pigment is not generally used for primer paints which are to be stored for long periods of time because of the reactivity of litharge with raw linseed oil. Generally, the 95% grade pigment is used for primer paints which are to be stored for relatively short periods of time and the 97% and 98% grades of red lead pigment are used for primer paints which are to be stored for relatively long periods of time. The concentration of the red lead pigment in present day primer paints is about 12 pounds per gallon (1437.60 grams per liter) of paint solids. The primer paints are formulated to have a pigment volume concentration within the range of 30% to 40% and generally are made to the high side of the range, usually about 38%.

The particle size of the red lead pigment is dependent upon the mode of manufacture. Furnace red lead pigments, which are used to formulate commercial primer paints, have a relatively coarse particle size within the range of 2 to 10 microns. Heavily pigmented primer paints made with such furnace red lead pigments have good brushing characteristics. Fumed red lead pigments, on the other hand, have a relatively fine particle size within the range of 0.25 to 4 microns and are generally not used to make red lead primer paints because such primer paints have a fluffy consistency.

Recent developments in synthetic binders or vehicles, such as the alkyd resins, have resulted in primer paints having accelerated drying times and good penetrating and weathering characteristics. Short oil and medium oil alkyd resins are used because of their very short drying times. Long oil alkyd resins have longer drying times than either the short or medium oil alkyd resins and are usually not used in the formation of red lead primer paints. Because of the high reactivity of litharge with the synthetic alkyd resins, the higher grades of the furnace red lead pigments, that is, 97% and 98% grades are used to manufacture such primer paints. Fumed red lead is not used because of its greater reactivity.

As is well known, lead compounds are toxic, therefore all primer paints which contain red lead pigments are toxic. In recent years efforts have been directed to finding a suitable substitute for primer paints which do not contain any red lead pigments. However, primer paints containing red lead pigments continue to be the best inhibitors of corrosion in use today.

SUMMARY OF THE INVENTION

It has been found unexpectedly that a primer paint having excellent wetting and penetrating characteristics and which, when applied to the surface of ferrous metals such as hand-cleaned steel products, produces a flexible, adherent film having excellent weathering and corrosion inhibiting characteristics, can be made by dispersing a relatively small quantity of a red lead pigment in a binder containing raw linseed oil and a long oil alkyd resin. The concentration of the red lead pigment in the primer paint is within the range of about 0.25 to 2.2 pounds per gallon (29.95 to 263.56 grams per liter) of paint solids and preferably 0.5 to 2.0 pounds per gallon (59.90 to 239.60 grams per liter) of paint solids. Any grade of red lead pigment, for example 85% to 98% grades, can be used to formulate the primer paint. The binder is comprised of one to two parts of raw linseed oil to one part of a long oil alkyd resin. The primer paint has a pigment volume concentration (PVC) within the range of 25% to 30%. The primer paint also contains inert pigment extenders, opacifiers, thinners and anti-skinning agents which are usually added to make such red lead primer paint.

It has also been unexpectedly found that fumed red lead within the concentration ranges of the invention is more effective in resisting corrosion in primer paint than is furnace red lead.

DESCRIPTION OF THE FIGURE

The FIGURE is a graph which shows the effect varied amounts of a 95% grade fumed red lead pigment and a 97% grade furnace red lead pigment in primer paints have on the corrosion resistance of hand-cleaned steel surfaces. The red lead pigments are well dispersed in a binder comprised of one part raw linseed oil and one part long oil alkyd resin. Other ingredients usually found in red lead primer paints are added to produce the primer paints. The pigment volume concentration (PVC) of each primer paint was 25%.

PREFERRED EMBODIMENT OF THE INVENTION

It has been found that a superior red lead primer paint can be produced by decreasing the concentration of red lead pigment well dispersed in a binder comprised of raw linseed oil and a long oil alkyd resin. The red lead primer paint so produced has good brushing, drying, wetting, and penetrating characteristics. The film produced when the red lead primer paint dries on the surface of ferrous metals, for example, hand-cleaned steels, has good flexibility and weathering characteristics and has excellent corrosion inhibiting properties.

The red lead primer paint is made by mixing a red lead pigment, such as 85% to 98% grade fumed red lead or furnace red lead in a binder comprised of one to two parts of raw linseed oil to one part of a long oil alkyd resin. The concentration of the red lead pigment in the primer paint is within the range of about 0.25 to 2.2 pounds per gallon (29.95 to 263.56 grams per liter) of paint solids. The pigment volume concentration of the red lead primer paint is maintained within the range of about 25% to about 30%. The primer paint also contains inert extenders, such as red iron oxide, mica, talc and bentone; drying agents such as 24% lead naphthenate and 60% cobalt naphthenate; an anti-skinning agent, such as butyraldoxime and thinners such as mineral spirits in amounts commensurate with good primer paint formulating practices.

The red lead primer paint can be made with any grade, for example 85% to 98% grades, of either fumed red lead or furnace red lead. While commercial primer paints have been made with furnace red lead pigments, such primer paints contain large concentrations of red lead pigment, for example about 12 pounds per gallon (1437.60 grams per liter) and protect hand-cleaned steel surfaces for about three to seven months, it has been found that with primer paints made with the concentrations of furnace red lead pigment noted above, the surfaces of hand-cleaned steels are protected from corrosion for a longer period of time, for example at least nine months. It has been unexpectedly found that primer paints made with concentrations of fumed red lead within the range specified above protect the surface of hand-cleaned steels for a longer period of time than do commercially available primer paints or primer paints made with small quantities of furnace red lead in accordance with the invention. It is preferred, therefore, to formulate the red lead primer with small amounts of fumed red lead.

Primer paints having the concentrations of red lead pigment within the range of about 0.25 to about 2.2 pounds per gallon (29.95 to 263.56 grams per liter) of paint solids provide increased resistance to corrosion to the surfaces of hand-cleaned steels on which they are coated. Better results are achieved by primer paints having a concentration of the red lead pigment within the range of about 0.50 to about 2.0 pounds per gallon (59.90 to 239.60 grams per liter) of paint solids. Best results are obtained by primer paints having a red lead pigment concentration of about 1.0 pound per gallon (119.8 grams per liter) of paint solids, that is, within the range of 0.7 to 1.3 pounds per gallon (83.85 to 155.74 grams per liter) of paint solids. In any case, the pigment volume concentration of the primer paints is maintained within the range of about 25% to about 30%.

As noted above, the primer paint of the invention can have a concentration of either fumed or furnace red lead pigment within the range of 0.25 to 2.2 pounds per gallon (29.95 to 263.56 grams per liter) of paint solids while the pigment volume concentration can vary within the range of about 25% to about 30%. Other inert extender pigments, such as red iron oxide, mica and preferably talc, are added in varying amounts to maintain the pigment volume concentration within the range of about 25% to about 30%. Fumed red lead pigment has a particle size within the range of 0.25 to 4.0 microns. When fumed red lead pigment is used in the quantities specified to produce the primer paint of the invention, the actual number of particles and the surface area of the particles in the primer paint of the invention are greater than the number of particles and the surface area of the particles in commercial primer paints made with furnace red lead since furnace red lead has a particle size within the range of 2 to 10 microns. The fumed red lead primer paints of the invention have improved corrosion inhibiting characteristics and improved wetting and penetrating properties when compared to commercial furnace red lead primer paints and generally have better corrosion inhibition properties than the furnace red lead primer paints of the invention.

It is preferred to use a binder containing raw linseed oil and a long alkyd oil resin in a 1:1 ratio, however the binder can have a ratio of 2:1 or two parts of raw linseed oil to one part of a long oil alkyd resin. The film produced by using a long oil alkyd resin dries more quickly than a binder which is all raw linseed oil but not as quickly as one made with short or medium oil alkyd resin. The through hardness of the film formed by a binder containing the long oil alkyd resin also develops less rapidly than the through hardness formed by a short or medium oil alkyd resin. However the film produced by the long oil alkyd resin gives better corrosion inhibition than short or medium oil alkyd resins.

A primer paint should contain a sufficient amount of the red lead pigment to have good corrosion inhibiting characteristics and should have an excess of binder to "wet" all the particles of the pigment and to "wet" all the rust and penetrate into the cracks of the mill scale remaining on hand-cleaned ferrous metals to effectively seal the cracks and form a coherent continuous film on the surface of the hand-cleaned ferrous metal.

Steel products, such as structural shapes and plates, are hand cleaned and usually a thin layer of rust particles and mill scale remains after cleaning. The primer paint of the invention very effectively "wets" the rust particles and penetrates into the pores of the particles of the rust and into the cracks in the mill scale carrying particles of the red lead pigment which effectively coat the rust and mill scale and exclude moisture and oxygen, thereby inhibiting the corrosion of the steel surface.

Other inert pigments, such as red iron oxide, talc, mica and bentone are added as inerts and colorants to produce the primer of the invention. Although such pigments are inert, that is, do not passivate the ferrous metal or react with the binder to affect drying, they are a part of the film and do add toughness and impermeability and hiding power to the adhering paint film produced on the ferrous metals.

The binder in the primer composition is a mixture of raw linseed oil and a long oil alkyd resin. A long oil alkyd resin may be defined as the product resulting from the reaction between a polyhydric alcohol and a resinifying carboxylic organic acid such as polybasic acids and their anhydrides. A long oil alkyd resin is one which contains 66% to 75% oil and 20% to 25% phthalic anhydride or 22-29 gallons of oil per 100 pounds of glyceryl phthalate (83.3 to 109.8 liters per 45.36 kilograms).

Commercial red lead primer paints are formulated to have a pigment volume concentration of between 30% and 40% and contain as much as 12.0 pounds or more of red lead pigment per gallon (1,437.60 grams per liter) of paint solids. To determine the effect of lower concentrations of fumed red lead pigment and furnace red lead pigment in primer paints at a constant pigment volume concentration of 25%, four primer paints containing varied amounts of 95% grade fumed red lead pigment were made. Four other primer paints containing varied amounts of 97% furnace red lead pigment, which were identical to the amounts in the 95% grade fumed red lead primer paints, were also formulated. A base composition, which was used to make the primer paints, did not contain any red lead pigment, and was made to the following composition as shown in Table I below:

TABLE I

Base Composition Without Red Lead Pigment

| | Ingredient | Lbs./100 Gal. of Primer | Gr./L. of Primer |
|---|---|---|---|
| Pigment | Iron oxide | 170 | 203.74 |
| | Talc | 399 | 478.58 |
| | Mica | 55 | 65.91 |
| | Bentone | 3 | 3.59 |
| Binder or Vehicle | Raw Linseed Oil | 237 | 283.99 |
| | Long Oil Alkyd Resin (Solids) | 237 | 283.99 |
| Driers | 24% Lead Naphthenate | 6 | 7.18 |
| | 60% Cobalt Naphthenate | 2 | 2.39 |
| Anti-skinning Agent | Butyraldoxime | 3 | 3.59 |
| Thinner | Mineral Spirits | 129 | 154.73 |
| Total weight per volume of paint | | 1,241 | 1,487.69 |

Primer paints shown below as primer paints 1, 2, 3 and 4 containing differing amounts of 95% grade fumed red lead pigment and essentially the same amounts of other ingredients (except talc) usually found in red lead primer paints, were made and had the concentrations of fumed red lead shown below in Table II:

TABLE II

Primer Paints Containing 95% Fumed Red Lead

| Primer Paints | Lbs/Gal of Solids | Gms/L of Solids | Particles/Gal* of Paint Solids |
|---|---|---|---|
| 1 | 7.4 | 887.60 | $61 \times 10^{13}$ |
| 2 | 2.7 | 323.85 | $22 \times 10^{13}$ |
| 3 | 1.05 | 125.94 | $8 \times 10^{13}$ |
| 4 | 0.25 | 29.95 | $2 \times 10^{13}$ |

*Calculaed from data in Pigment Handbook, Vol. 1, Properties and Economics, Temple C. Patton, 1973, page 838.

The other four primer paints shown below as 5, 6, 7 and 8 containing differing amounts of 97% grade furnace red lead pigment and essentially the same amounts of other ingredients (except talc) usually found in red lead primer paints were made. The four primer paints are shown below in Table III:

TABLE III

Primer Paints Containing 97% Furnace Red Lead

| Primer Paints | Lbs/Gal of Solids | Gms/L of Solids | Particles/Gal* of Paint Solids |
|---|---|---|---|
| 5 | 7.4 | 887.60 | $1.9 \times 10^{13}$ |
| 6 | 2.7 | 323.85 | $.69 \times 10^{13}$ |
| 7 | 1.05 | 125.94 | $.27 \times 10^{13}$ |
| 8 | 0.25 | 29.95 | $.06 \times 10^{13}$ |

*Calculated from data in Pigment Handbook, Vol. 1, Properties and Economics, Temple C. Patton, 1973, page 838.

The amount of talc was varied to preserve the 25% pigment volume concentration of all the primer paints listed in Tables II and III.

The primer paints shown in Tables II and III were tested by spraying them on test specimens as described hereinafter.

Test specimens 4 inches × 4 inches × 12 inches (10.16 centimeters × 10.16 centimeters × 30.48 centimeters) were cut from a ⅜ inch (0.96 centimeters) thick low carbon ASTM A-36 structural steel angle. The test specimens were exposed to the same atmospheric conditions to prerust the steel. Several specimens were exposed for two weeks and several for eight weeks to provide moderate (about 20% rusted) and considerable (about 80% rusted) prerusted surfaces, respectively. The specimens were hand cleaned by wire brushing in accordance with steel structures painting council specification SSPC-SP-2-63, No. 2 Hand Tool Cleaning, to remove loose scale and rust. The specimens were brushed at a rate of two square feet per minute (0.185 square meters per minute) to obtain a uniform degree of cleaning. Additionally, an unrusted scale-bearing steel angle and a flat bar four inches by twelve inches and ⅜ inch in thickness (10.16 centimeters × 30.48 centimeters × 0.95 centimeters) which was blast cleaned to remove scale were tested.

The specimens were air sprayed with the primer paints described in Tables II and III. A mechanically-controlled air gun was used to spray the specimens with the primer paints to produce a film thickness of about two mils on the surface of the specimens. The thickness was determined with a GE type B magnetic film thickness gage.

The specimens were fastened on test panels in an open air atmosphere at a 45° angle to the ground with the test surfaces facing south. The specimens were routinely inspected and rated over a period of eighteen months. The ratings were expressed in two ways:

1. rust rating determined by visual comparison with a set of photographic standards -ASTM-D-610-43, and
2. exposure time until rust breaks through the film at a failure level of "8" by the standards.

The photographic standards are graded from "10 to 0" with "10" representing no visible rust failure and "0" representing complete rust failure. Ferrous metals coated with a primer paint are exposed to the atmosphere and are examined periodically. Their surfaces are compared to the photographic standards. Any rating of the painted ferrous metal surface below "8" means that the ferrous metal should be repainted. The protective life of a primer paint is taken as that period of time during which the ferrous metal surface was exposed to the atmosphere prior to being rated "8" or below by comparison with the photographic standards. Primer paint is expected to protect the surface of ferrous metals for between three to seven months in accordance with Paint Application Guide, SSPC-PA-1.

The results of the tests are shown in the FIGURE. Curve A represents the corrosion of the specimens coated with 95% fumed red lead pigmented primer paints and Curve B represents the corrosion of the specimens coated with 97% fumed red lead pigmented primer paints. Both Curves A and B show that as the concentration of the red lead pigment in the primer paints is decreased from about 2.7 pounds per gallon (323.85 grams per liter) of paint solids, the corrosion inhibiting characteristics begin to improve dramatically. The improvement in such corrosion inhibiting characteristics is not so great in primer paints containing 97% furnace red lead pigment as in the primer paints containing 95% fumed red lead pigment, nevertheless there is a decided improvement over primer paints made with larger concentrations of furnace red lead pigments. The improvement continues in both primer paints until the concentration of red lead pigment is decreased to about 1.0 pound per gallon (119.8 grams per liter) of paint solids. Decreasing the concentration of red lead pigment in the primer paints below 1.0 pound per gallon (119.8 grams per liter) of paint solids resulted in a decrease in the corrosion inhibiting characteristics of both primer paints. Concentrations as low as 0.25 pound per gallon (29.95 grams per liter) of paint solids, however, had better corrosion inhibiting characteristics than concentrations greater than 2.7 pounds per gallon (323.85 grams per liter) of paint solids.

Primer paints which contain either fumed or furnace red lead pigments in concentrations lower than 2.2 pounds per gallon (263.56 grams per liter) of paint solids have improved corrosion resistant characteristics when applied to the surfaces of hand-cleaned ferrous metals. Although the primer paints which have a red lead pigment concentration within the range of 0.25 to 2.2 pounds per gallon (29.95 to 263.52 grams per liter) of paint solids have improved corrosion resistant properties while maintaining good brushing characteristics and good wetting and penetrating characteristics and produce a film which has good adherence to the surface of ferrous metals, good flexibility and good weathering characteristics, a primer paint composition in which the pigment used is fumed red lead in the concentrations within the range of 0.25 to 2.2 pounds per gallon (29.95 to 263.56 grams per liter) of paint solids had better corrosion inhibiting characteristics than did the primer paints containing furnace red lead pigments. It is preferred to use 95% fumed red lead pigment in the range of concentrations within the range of 0.50 to 2.0 pounds per gallon (59.90 to 239.60 grams per liter) of paint solids. The primer paint will have a pigment volume concentration within the range of 25% to 30% and the binder is comprised of one part of raw linseed oil to one part of a long oil alkyd resin.

In a specific example of the invention, a primer paint containing 95% fumed red lead pigment was made having a composition shown in Table IV below:

TABLE IV

Composition of Primer Paint Containing 95% Fumed Red Lead Pigment

| Ingredient | Lbs/100 Gal of Primer | Gr./Liter of Primer |
|---|---|---|
| 95% Fumed Red Lead | 100 | 119.83 |
| Iron Oxide | 170 | 203.74 |
| Talc | 368 | 440.96 |
| Mica | 55 | 65.90 |
| Bentone | 3 | 3.59 |
| Raw Linseed Oil | 237 | 283.99 |
| Long Oil Alkyd Resin (Solids) | 237 | 283.99 |
| 24% Lead Naphthenate | 6 | 7.19 |
| 60% Cobalt Naphthenate | 2 | 2.39 |
| Butyraldoxime | 3 | 3.59 |
| Mineral Spirits | 129 | 154.57 |
| Total weight per volume of paint | 1,310 | 1,569.74 |

The primer paint had a pigment volume concentration of 30%. Its viscosity, as packaged, was found to be 78 K.U., ±5 K.U. when measured by a Krebs Stormer Viscosimeter. One gallon of paint weighed 13.10 pounds (1569.74 grams).

The primer paint was applied to standard test specimens, low carbon ASTM-36 structural angles, 4 inches long by 4 inches wide by ⅜ inch thick by 1 foot long (10.16 centimeters × 10.16 centimeters × 0.95 centimeters × 30.48 centimeters) by air spraying. A coating two mils thick when measured dry was sprayed on the specimens. The film thickness was determined by a GE type B magnetic film thickness gage. The test specimens had a mill scale bearing surface which was prerusted in a representative environment. Several specimens were prerusted for two weeks to produce moderate rusting. Other specimens were prerusted for eight weeks to produce severe rusting. Additional test flat bars which were 4 inches long × 12 inches wide × ⅜ inch thick (10.16 centimeters × 30.68 centimeters × 0.95 centimeters) were also coated in the same manner. These flat bars were not rusted and had scale blasted off. All test specimens were mounted in support brackets in an open field, facing south. The test specimens were mounted at a 45° angle to the horizontal.

The rust rating was determined by visual comparison with a set of photographic standards, ASTM D610-43, and as exposure time until rust breaks through at a failure level of eight by these standards. The photographic standards are graded from 0–10 with 0 representing complete rust failure and 10 representing no visible rust failure. The moderately prerusted test specimens were rated 9 to 9½ after a six-month exposure and 9 after a nine-month exposure. The severely prerusted test specimens were rated 9 after a six-month exposure and 8½ to 9 after a nine-month exposure.

While we have shown the primer paints of the invention used to inhibit the corrosion of ferrous metals which have been hand-cleaned, it is within the scope of this invention to use these paints to inhibit the corrosion of ferrous metals which have been cleaned by other methods, such as sand blast cleaning.

In these specifications, the percentage of the pigment to the binder (pigment volume concentration — PVC) is expressed on a volume basis and the amount of each ingredient in the total make-up of paint in Tables I and IV is expressed on a weight per total volume of paint. The relationships expressed in Tables II and III are on a weight of pigment per volume of dry film solids.

I claim:

1. A red lead primer paint for coating the surface of ferrous metals comprising between 0.25 to 2.2 pounds of an 85% to 98% grade of red lead pigment per gallon (29.95 to 263.46 grams per liter) of paint solids well dispersed in a binder comprised of raw linseed oil and a long oil alkyd resin in a ratio of between 1:1 to 2:1, said primer paint having a pigment volume concentration of between about 25% to 30% and being characterized by having improved wetting and penetrating properties and improved corrosion inhibiting properties, and producing a coating having improved adherence to the surface to which it is applied.

2. The primer paint of claim 1 in which the concentration of red lead pigment per gallon of solids is within the range of 0.5 to 2.0 pounds (59.90 to 236.60 grams per liter) of solids.

3. The primer paint of claim 1 in which the vehicle is one part raw linseed oil and one part long alkyd oil resin.

4. The primer paint of claim 1 in which the pigment volume concentration is about 30%.

5. The primer paint of claim 1 in which the pigment is furnace red lead.

6. The primer paint of claim 1 in which the ferrous metal to be coated is hand-cleaned steel.

7. A red lead primer paint for coating the surface of ferrous metals comprising between 0.25 to 2.2 pounds of an 85% to 98% grade of fumed red lead pigment per gallon (29.95 to 263.56 grams per liter) of paint solids, said fumed red lead pigment being well dispersed in a binder comprised of raw linseed oil and a long oil alkyd resin in a ratio of between 1:1 to 2:1, said primer paint having a pigment volume concentration of between about 25% to 30%, and being characterized by having improved wetting and penetrating properties and improved corrosion inhibiting characteristics and producing a coating characterized by having improved adherence to the surface to which it is applied.

8. The primer paint of claim 7 in which the concentration of red lead pigment is within the range of 0.50 to 2.0 pounds per gallon (59.90 to 239.60 grams per liter) of paint solids.

9. The primer paint of claim 7 in which the binder is comprised of one part of raw linseed oil to one part of a long oil alkyd resin.

10. The primer paint of claim 7 in which the pigment is 95% grade fumed red lead.

* * * * *